United States Patent [19]

Farr

[11] Patent Number: 4,883,327
[45] Date of Patent: Nov. 28, 1989

[54] HYDRAULIC ANTI-LOCK BRAKING SYSTEMS FOR VEHICLES

[75] Inventor: Glyn P. R. Farr, Warwickshire, England

[73] Assignee: Lucas Industries, Great Britain

[21] Appl. No.: 299,402

[22] Filed: Jan. 19, 1989

[30] Foreign Application Priority Data

Jan. 30, 1988 [GB] United Kingdom ............... 8802091

[51] Int. Cl.⁴ .......................... B60T 8/40; B60T 13/70
[52] U.S. Cl. ........................ 303/116; 303/61; 303/110; 188/181 R
[58] Field of Search ............ 303/116, 119, 117, 10–12, 303/110, 113, 61–63, 68–69; 188/181 A, 181 R

[56] References Cited

U.S. PATENT DOCUMENTS

| | | | |
|---|---|---|---|
| 3,524,684 | 8/1970 | Skoyles | 303/116 |
| 3,532,391 | 10/1970 | Klein | 303/116 X |
| 3,574,416 | 4/1971 | Skoyles | 303/10 X |
| 3,601,452 | 8/1971 | Brunner | 303/61 X |
| 3,608,984 | 9/1971 | Skoyles | 303/61 X |
| 3,645,584 | 2/1972 | Leiber et al. | 303/61 X |
| 3,724,914 | 4/1973 | Skoyles | 303/116 |
| 3,847,449 | 11/1974 | Adahan | 303/116 |
| 4,090,739 | 5/1978 | Iio | 303/116 X |
| 4,099,793 | 7/1978 | Iio | 303/116 |
| 4,179,166 | 12/1979 | Sharp et al. | 303/116 X |
| 4,556,260 | 12/1985 | Maehara | 303/116 |
| 4,779,936 | 10/1988 | Farr | 303/116 |

Primary Examiner—Douglas C. Butler
Attorney, Agent, or Firm—Laff, Whitesel, Conte & Saret

[57] ABSTRACT

A hydraulic anti-lock braking system incorporates a pump for generating the energy necessary to re-apply a brake automatically after pressure applied to the brake from a master cylinder has first been released to prevent the wheel controlled by that brake from locking. The pump is adapted to pump fluid back both to the brake and to the master cylinder. Pumping the fluid back to the brake achieves a satisfactory pedal feel, and pumping fluid back to the master cylinder ensures the use of a fail-safe re-application of brake pressure.

11 Claims, 4 Drawing Sheets

HYDRAULIC ANTI-LOCK BRAKING SYSTEMS FOR VEHICLES

This invention relates to hydraulic anti-lock braking systems for vehicles of the kind in which the supply of hydraulic fluid from a supply, suitably a master cylinder, to a brake on a wheel is modulated in an anti-lock mode in accordance with the behaviour of the braked wheel, and a pump is adapted to generate the energy necessary to re-apply the brake automatically after the pressure applied to the brake has first been released to prevent the wheel from locking.

In one known hydraulic anti-lock braking system of the kind set forth, for example as disclosed in EP-A-0 202 845, in an anti-lock mode a first control valve is adapted to isolate the master cylinder from the brake, and a second control valve is adapted to release fluid from the brake to an expansion chamber. In such a system the pump, which is driven by an electric motor, is adapted to return fluid from the expansion chamber to the master cylinder, and the first valve is also used to control the rate at which the brake is re-applied.

In braking systems of the type such as EP-A-0 202 845, during the anti-lock mode it is very difficult to balance the rate of which the brake is re-applied with the rate at which the pump returns fluid from the expander chamber to the master cylinder. Unless this can be achieved, the driver experiences an uncomfortable reaction or "feel" at the brake pedal, accompanied by substantial noise transmitted back through the bulkhead of the vehicle.

Such a problem does not arise in known hydraulic anti-lock braking systems of the kind set forth and in which the "feel" is unaffected by cyclic brake pressure changes so that a good pedal feel is therefore achieved. In one such known system this is achieved by the provision of a de-boost piston which isolates the master cylinder from the cyclic brake pressure, and in another known system fluid is pumped back to the brake itself.

These two further known systems cannot rely on a motor driven pump to generate the energy necessary to re-apply the brake during an anti-lock mode since failure of the motor itself would then prevent the brake from being re-applied. It is therefore necessary, for safety purposes, either to provide a second pump driven independently of the first, or to arrange for the de-boost piston to be supported by a large spring or by pressure in an hydraulic accumulator. These additional means therefore add to the complexities and to the weight of the system. They also increase the cost of the system.

According to our invention, in an hydraulic anti-lock braking system of the kind set forth the pump which is driven by a motor is adapted to pump fluid back both to the brake and to the master cylinder during an anti-lock mode.

Pumping the fluid back to the brake provides a satisfactory pedal feel, and pumping the fluid back to the master cylinder ensures the use of a failsafe re-application of brake pressure.

Conveniently substantially 70% of output from the pump is returned to the brake, and the remaining substantially 30% is returned to the master cylinder.

Returning a relatively small proportion of the output to the master cylinder reduces noise and enables us to reduce the size of the motor in comparison with that of the motor which is normally required in those known systems in which substantially the whole of the output from the pump is returned to the master cylinder.

Preferably the pump comprises a plunger working in a bore in a housing and movable in a first direction during an induction stroke to draw fluid into a pressure space in the bore in front of the plunger from an expansion chamber and through a one-way inlet valve, the plunger being movable in a second opposite direction during a power stroke to pump fluid from the pressure space to the brake and to the master cylinder through respective first and second flow-control means.

The flow-control means are so constructed and arranged that a major portion of the output from the pump is returned to the brake during the delivery stroke of the pump and a relatively smaller portion is returned to the master cylinder.

The first flow-control means may comprise a restricted orifice or a first one-way outlet valve, and the second flow-control means may comprise a second one-way outlet valve.

When the first flow-control means comprises a first one-way outlet valve, one of the outlet valves is rendered inoperative when the plunger has moved through a first predetermined distance during the power stroke whereafter the output from the pump during the reminder of the power stroke takes place through the other one-way valve.

The outlet valves may be arranged so that fluid is pumped to the brake during movement of the plunger through the first predetermined distance, with the output from the pump during the remainder of the power stroke being pumped to the master cylinder after an output port leading to the one-way valve through which the brake is supplied has been masked by the plunger.

When the first flow-control valve comprises the restricted orifice, the orifice is so positioned, constructed, and arranged that it achieves a build up of back pressure capable of causing the second one-way valve to open. This allows partial feedback of fluid to the master cylinder, at the same time as fluid is pumped back to the brake.

Conveniently a first normally-open control valve is located between the master cylinder and the brake, and a second normally-closed control valve is located between the brake and the expansion chamber, both control valves being responsive to an anti-lock signal whereby the first valve to caused to close and isolate the master cylinder from the brake, the second valve is caused to open to release fluid from the brake to the expansion chamber, and the motor is operated to cause the pump plunger to oscillate.

Both control valves may comprise solenoid-operated valves. However, in a modification, the first valve may comprise a flow-regulator.

Some embodiments of our invention are illustrated the accompanying drawings in which.

Figure 1:
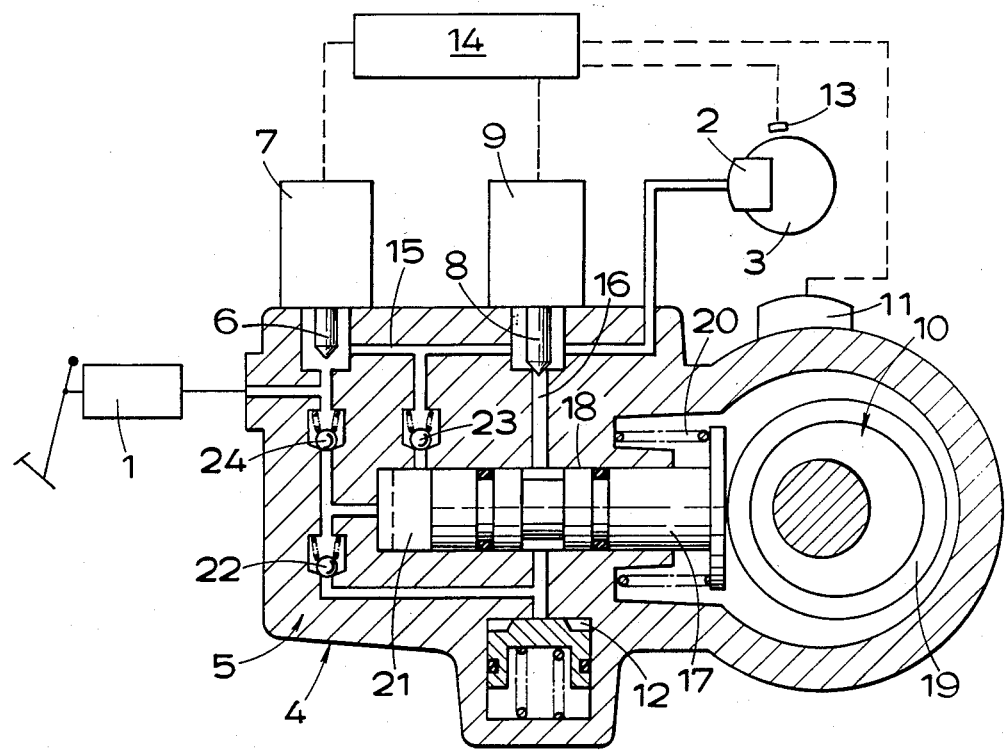
FIG. 1 is a layout of a single channel hydraulic anti-lock braking system for a vehicle.

In the braking system shown in the layout of FIG. 1, fluid under pressure from a master cylinder 1 is applied to a brake 2 or a wheel 3 of a vehicle through a modulator assembly 4.

The modulator assembly 4 comprises a housing 5 incorporating a first valve 6 controlled by a first solenoid 7, a second valve 8 controlled by a second solenoid 9, an hydraulic pump 10 driven by an electric motor 11, and an expansion chamber 12 of which the effective volume is variable.

Signals from a sensor 13 sensing the behaviour of the wheel 3 are fed to an electronic control module 14 which controls energisation of the two solenoids 7 and 9 and operation of the electric motor 11.

The first valve 6 controls communication from the master cylinder 1 to the brake 2 through a passage 15 in the housing 5, and the second valve 8 controls communication between the passage 15, and transverse passage 16 leading to the expansion chamber 12.

The pump 10 comprises a plunger 17 which is reciprocable in a bore 18 by means of an eccentric drive 19 from the motor 11, and a spring 20 acts to hold the plunger 17 in engagement with the drive 19.

A pressure space 21 is defined in the bore 18 in advance of the plunger 17. During an induction stroke of the plunger 17 in the direction in which the plunger 17 is urged by the spring 20, fluid is drawn into the pressure space 21 from the expansion chamber 12 through a one-way inlet valve 22. During a power stroke in which the plunger 17 is movable in the opposite direction fluid is pumped from the pressure space through first and second one-way outlet valves 23 and 24.

As illustrated, the first outlet valve 23 leads from the pressure space 21 to the passage 15 on the downstream side of the valve 24, and is located in the wall of the bore 18 at a position spaced from the inner end of the plunger 17, at least when the plunger 17 is in a retracted position at the extent of its induction stroke.

The second outlet valve 24 is disposed between the end of the bore 18 and the master cylinder 1.

In a normal inoperative "brakes-off" position the valve 6 is open to provide unrestricted communication between the master cylinder 1 and the brake 2, the valve 8 is closed to isolate the brake 2 from the expansion chamber 12, and the motor 11 is stationary.

When the master cylinder 1 is operated, fluid is supplied through the open valve 6 to apply the brake 2.

When the control module 14 receives a skid signal from the sensor 13 indicative of a critical wheel condition, the module 14 is operative to energise the solenoids 7 and 9 to close the valve 6 and open the valve 8, and to energise the motor 11 to cause the plunger 17 to reciprocate in the bore 18.

Closing the valve 6 isolates the master cylinder 1 from the brake 2, opening the valve 8 connects the brake 2 to the expansion chamber 12 through the transverse passage 16 to relieve some of the pressure applied to the brake 2, and reciprocating the plunger 17 causes the plunger to withdraw fluid from the expansion chamber 12 and pump it to the brake 2 through the outlet valve 23 during the first part of the movement of the plunger 17 until the connection to the valve 23 is masked by the plunger 17, whereafter fluid is pumped back to the master cylinder 1 through the outlet valve 24.

During this operation fluid is circulated back to the brake 2 at low pressure since that pressure is continuously being relieved to the expansion chamber 12.

During the first part of the movement of the plunger 17 in the power stroke, fluid is returned to the brake 2 in preference to the master cylinder 1, since the valve 23 only has to open against a pressure which is substantially lower than that being generated by the master cylinder 1.

When the wheel recovers, the corresponding signal from the sensor 13 causes the control module 14 to permit the valve 8 to close. As described above, the pump 10 pumps fluid from the expansion chamber 12 to the brake 2 and to the master cylinder 1 but, since the valve 8 has closed, the chamber 12 is not replenished from the brake 2 because communication through the passage 16 has been cut-off. The brake 2 is therefore re-applied by the pump 10, until the fluid within the expander chamber 12 has been recovered. When that is achieved, the pressure applied to the brake 2 is held at a level below that which caused the skid signal, at least for a predetermined period of time. This period is related to the behaviour of the wheel 3 immediately prior to the skid signal. For example, if the departure of the wheel from its true speed is small and of short duration, the brake pressure will be re-applied to almost the pressure applied when the skid signal was emitted. Within a relatively short time the solenoid 7 will be pulsed to increase the pressure further by allowing the higher pressure at the master cylinder 1 to be applied to the brake 2. However, should wheel recovery be slow, the brake pressure will be applied to a lower level and will be retained at that level for a relatively longer period before the solenoid 7 is pulsed to increase the pressure further.

Figure 2:
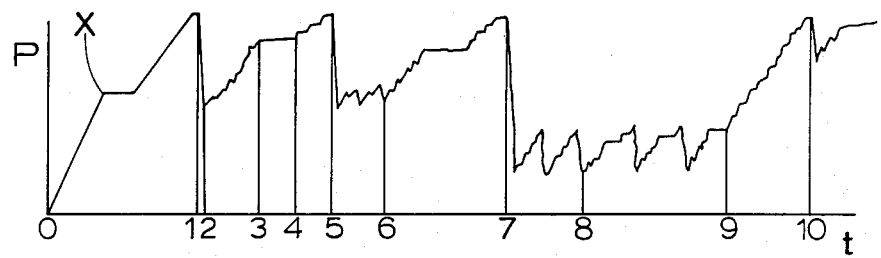
FIG. 2 is a graph of a trace showing a typical braking cycle of FIG. 1.

FIG. 2 shows a trace of brake pressure (P) plotted against time (t) for the characteristics of the system of FIG. 1 and which illustrates the following actions:

0–1 Stepped first brake pressure application by momentarily closing the valve 6 at point X to reduce the initial rise rate;

1–2 Close the valve 6 and open the valve 8 to isolate the master cylinder 1 from the brake 2, and relieve pressure to the expansion chamber 12;

2–3 With the valves 6 and 8 closed, the pump 10 returns fluid to the brake 2 and to the master cylinder 1;

3–4 The brake 2 is held at a pressure just below the skid pressure. The valves 6 and 8 are closed.

4–5 The valve 6 is cycled by pulsing the solenoid 7 to increase pressure;

5–6 The valve 6 is closed, and the valve 8 opens to relieve the brake 2 and thereafter cycles to keep the pressure low;

7–8 Repeats the action of 2–5 above;

7–8 The vehicle passes onto a surface of low friction. The valve 6 is closed, and the valve 8 is cycled at the new skid pressure. Excess fluid is returned to the master cylinder 1;

8–9 Repeats the action of 2–5 above, but at lower pressure; and

9–10 The vehicle passes onto a surface of relatively high friction. The valve 6 is cycled to increase brake pressure.

The "feel" at the brake pedal will be very good with the system described above. When the pressure is applied (2–3) only a portion of the output from the pump 10, substantially 30%, is returned to the master cylinder 1. This causes only a slight "push back" at the pedal.

During the stage (3–4), where the pressure is held steady, the pedal remains firm.

For the stage (4–5) the pedal will be eased down to increase brake pressure. Normally, therefore, the brake pedal will move to a position to apply the brakes and in anti-lock mode, will only move slightly, in both directions, from this position. This enables us to use as the tandem master cylinder 1 a master cylinder of the standard AS/AS type. In this known type of master cylinder, a recuperation seal on each piston is adapted to close a radial recuperation port in the wall of the body of the master cylinder. Any movement of the pistons, which dictates the pedal movement described in stage (4–5), will be insufficient to cause any damage to the recuperation seals, in comparison with other known anti-lock systems, for example of the kind in which the total output from a pump is returned to the master cylinder.

In such known systems referred to above the movements of the pistons are correspondingly greater and can cause damage to the recuperation seals. It is therefore necessary to utilise special master cylinders in order to overcome this problem.

Figure 3:
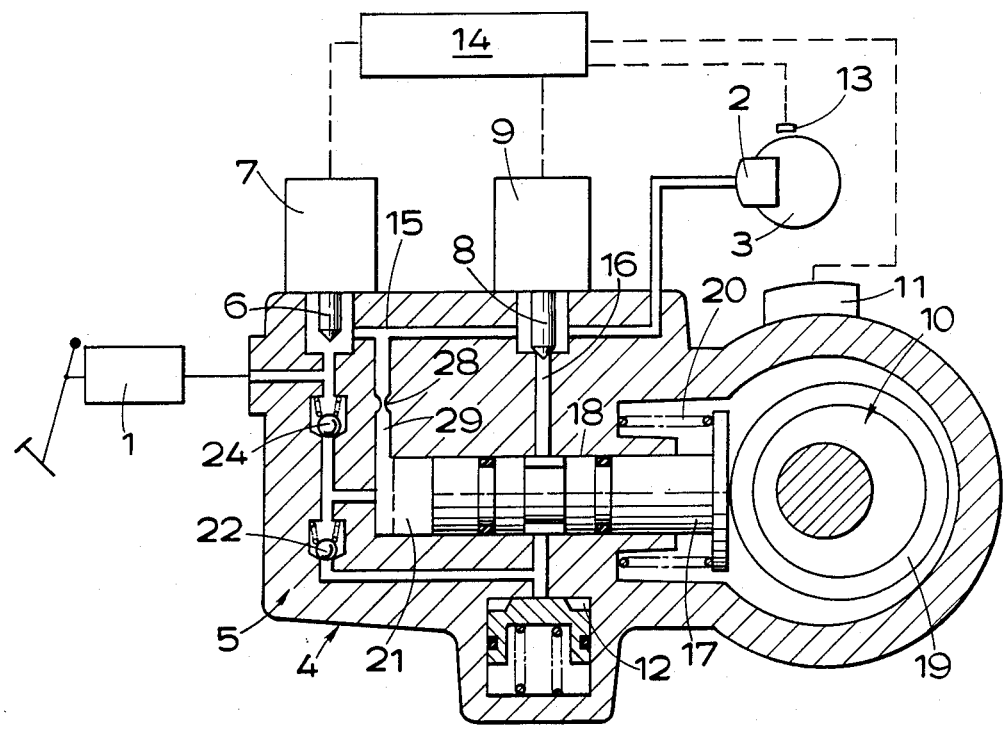
FIG. 3 is a layout of a system similar to FIG. 1 but showing a modification.

In the system illustrated in the layout of FIG. 3 of the accompanying drawings, the one-way valve 23 through which fluid is pumped back to the brake 2 is replaced by a restricted orifice 28 located in a passage 29 which communicates with the end portion of the bore 18 which is remote from the drive 19 and is unswept by the plunger 17.

When the plunger 17 is reciprocated in the bore 18, during the delivery stroke fluid is displaced from the pressure space 21 both to the brake 2 through the orifice 28 and to the master cylinder 1 through the one-way valve 24. Specifically, during the delivery stroke, the orifice 28 is adapted to achieve a build up of back pressure in the pressure space 21 which is capable of temporarily causing the valve 24 to open. This allows partial feedback of fluid to the master cylinder 1 at the same time as fluid is pumped to the brake 2 through the orifice 28.

In essence, therefore, the systems of FIGS. 1 and 3 are basically the same since when the plunger 17 passes over the connection to the valve 23 in FIG. 1, the annular restriction so generated is substantially equivalent to the orifice 28 in FIG. 3.

The construction and operation of the syste of FIG. 3 is otherwise the same as FIG. 1, and corresponding reference numerals have been applied to corresponding parts.

Figure 4:
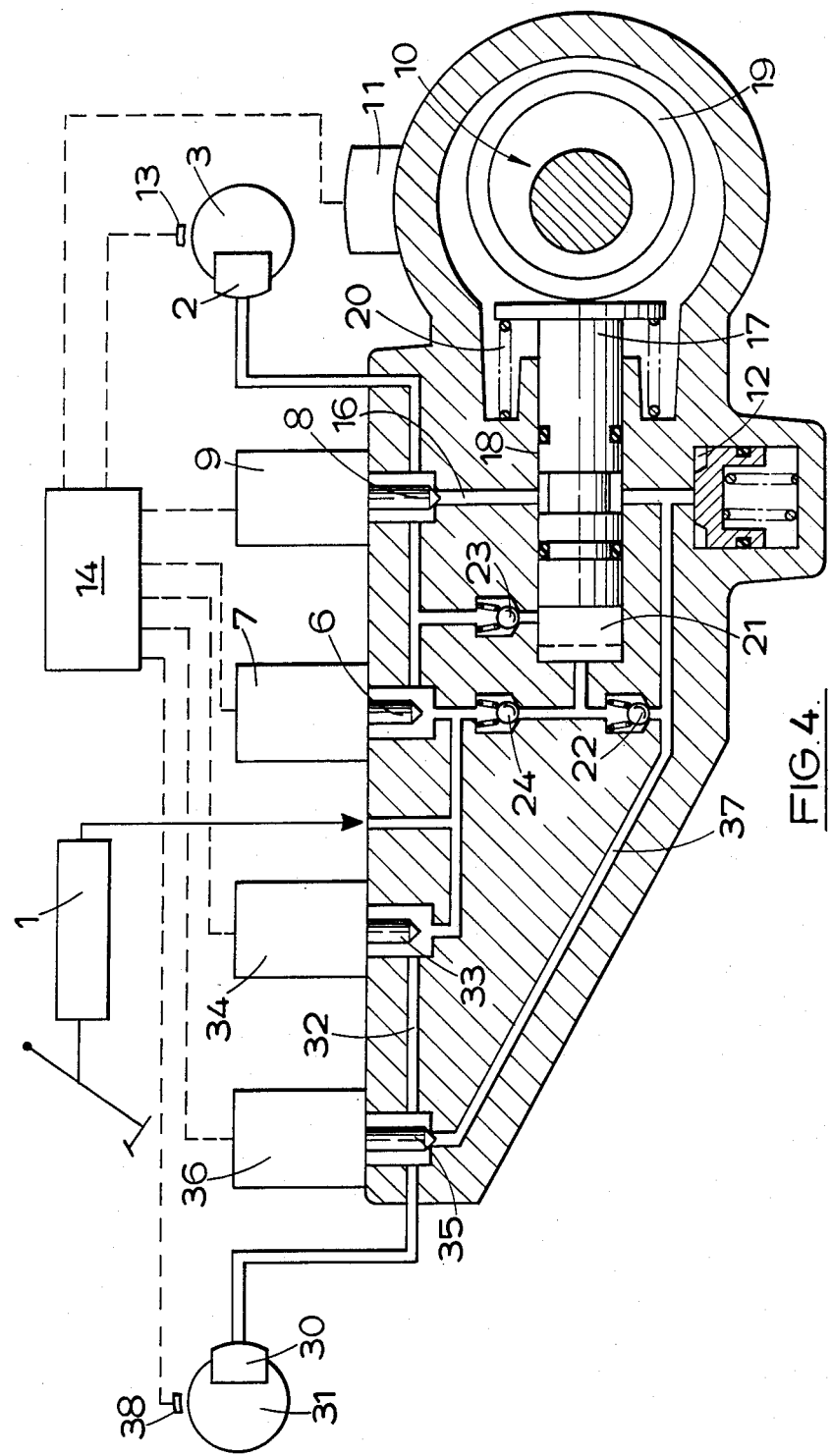
FIG. 4 is a layout of another hydraulic anti-lock braking system in which a front wheel brake and a rear wheel brake are independently controlled.

In the anti-lock braking system of the two-channel 'X' split type shown in the layout of FIG. 4, the brake 2 comprises a brake on one front wheel 3 of a four-wheel vehicle, and the modulator assembly 4 is adapted also to control the behaviour of a brake 30 on the diagonally opposite rear wheel 31.

In order to achieve this the master cylinder 1 is connected to the rear wheel brake 30 through a passage 32 in the housing 5, and the modulator assembly 4 incorporates a third valve 33 controlled by a third solenoid 34, and a fourth valve 35 controlled by a fourth solenoid 36.

The third valve 33 controls communication from the master cylinder 14 to the brake 30 through the passage 32 and the fourth valve 35 controls communication between the passage 32, and a passage 37 leading to the expansion chamber 12 through the passage on the upstream side of the one-way valve 22.

Signals from a sensor 38 sensing the behaviour of the rear wheel 31 are fed to the control module 14 which also controls energisation of the two solenoids 34 and 36.

Operation of the front wheel brake 2 is controlled during normal braking and during an anti-lock mode as described above with reference to FIGS. 1 and 2.

When the brakes are applied normally the front wheel brake 2 is applied as described above with reference to FIGS. 1 and 2. The valve 33 is open and the valve 35 is closed so that fluid is also supplied to the rear wheel brake 31 from the master cylinder 1 and through the passage 32.

In the event of the sensor 13 emitting a skid signal, the operation of the brake 2 in the anti-lock mode is controlled as described above with reference to FIGS. 1 and 2.

In the event of the sensor 38 emitting a skid signal, the control module 14 is operative to energise the solenoids 34 and 36 to close the valve 33 and open the valve 35, and to energise the motor 11 to cause the plunger 17 to reciprocate in the bore 18.

Closing the valve 33 isolates the master cylinder 1 from the brake 30, opening the valve 35 connects the brake 30 to the expansion chamber 12 to relieve some of the pressure applied to the brake 31, and reciprocating the plunger 17 causes the plunger to withdraw fluid from the expansion chamber 12 and pump it to the master cylinder 1 through the outlet valve 24.

When the wheel 31 recovers, the corresponding signal from the sensor 38 causes the control module 14 to permit the valve 36 to close. As described above, the pump 10 pumps fluid from the expansion chamber 12 to the master cylinder 1, but since the valve 36 has closed, the chamber 12 is not replenished from the brake 30.

Within a relatively short time the solenoid 34 will be pulsed which allows the higher pressure at the master cylinder 1 to be applied to the brake 30.

Should only the rear brake 30 be controlled during anti-lock, all the output from the pump 10 will be diverted towards the master cylinder 1.

The fluid relieved from the rear brake 31 during its anti-lock mode is relieved to the same expansion chamber 12 as that to which the fluid from the front wheel brake 2 is relieved and the pump 10 is arranged to increase output to the master cylinder 1 to compensate for the volume requirements of the rear brake 31.

The construction and operation of the anti-lock system of FIG. 4 is otherwise the same as that of FIG. 1, and corresponding reference numerals have been applied to corresponding parts.

Should the vehicle be equipped with a traction-control system in which the master cylinder 1 is operated independently of its pedal to apply the brake on a driven spinning wheel so that traction is applied by the non-spinning wheel at the opposite end of a common axle, then the following conditions will apply.

For a vehicle of the front wheel drive type the third valve 33 will close and the first valve 6 will open to prevent the front wheel from spinning. To relieve the pressure applied to the front wheel brake 2, the first valve 6 is closed and the second valve 8 opens. In order to re-apply the front wheel brake 2, the second valve 8 is closed. If sufficient pressure is present, the first valve 6 is cycled to increase the pressure applied to the brake 2 but if the pressure is excessive, the second valve 8 is opened to reduce the pressure.

For a vehicle of the rear wheel drive type the first valve 6 will close and the second valve 8 will open so that the pump 10 returns fluid to the master cylinder. The third valve 33 and the fourth valve 35 will be cycled to control the pressure applied to the rear brake 30.

In a modification the connections to the brakes 2 and 30 are swapped. In such a modification, the first and second valves 6 and 8 will control the rear brake 30, and the third and fourth valves 33 and 35 will control the front wheel brake 2.

Figure 5:
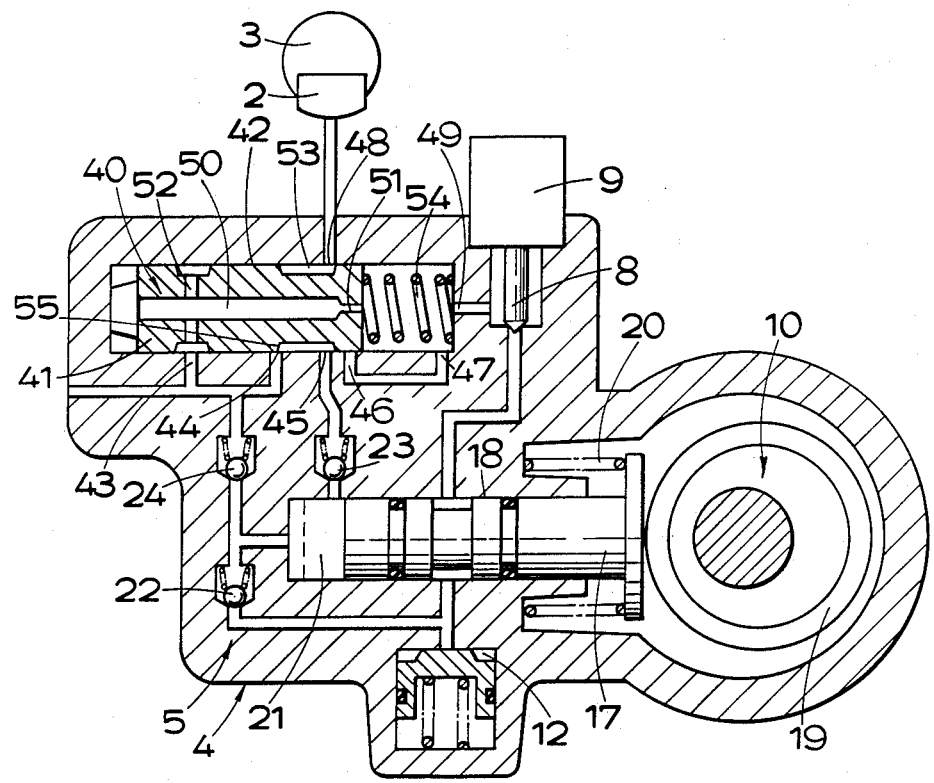
FIG. 5 is a system similar to FIG. 1 but showing a modification.

In the anti-lock braking system illustrated in FIG. 5 of the accompanying drawings, the first valve 6 and the first solenoid 7 have been replaced by a flow-control regulator valve 40.

As illustrated the flow-control valve 40 comprises a spool 41 working in a bore 42 in the housing 5.

The bore 42 has axially spaced radial ports 43, 44, 45, 46 and 47 of which the first two are connected directly to the master cylinder 1, the third 45 is on the downstream side of the one-way valve 23, and the fourth 46 is connected to the fifth 47 which, in turn, is disposed at the inner end of the bore 42 adjacent to the valve 8. A fourth radial port 48, opposite the third port 45, is connected to the brake 2, and an axial passage 49 in the end of the bore 42 leads to the valve 8.

The spool 41 is provided with a longitudinally extending bore 50 which at the end adjacent to the valve 8 defines a restricted orifice 51 of reduced diameter. A transverse passage 52 connects the port 43 to the passage 50, and an annular groove 53 provides communication between the port 44 and the port 45. A face 55 at the one end of the groove 53 defines a knife-edge which co-operates with the port 44 to define a variable orifice. Normally the spool 41 is urged relatively away from the valve 8 by means of a spring 54. In the extreme retracted position shown the variable orifice is in its position of maximum flow.

When the brake 2 is applied normally, fluid from the master cylinder is supplied to the brake 2 through the variable orifice.

Figure 6:
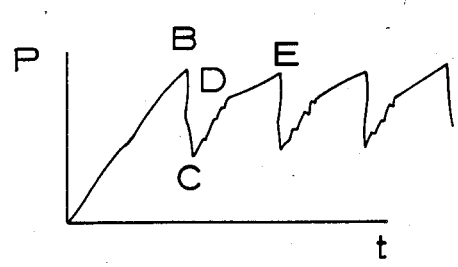
FIG. 6 is a graph of a trace showing a typical braking cycle of FIG. 5.

In the event of a skid signal being emitted at point B in the graph of FIG. 6, the electric motor is energised and the valve 8 is opened, and fluid is relieved to the expansion chamber 12 through the fixed orifice 5 at point B in FIG. 5. The pressure drop across the orifice causes the spool 41 to move relatively against the loading in the spring 54, in turn to close the variable orifice, and place the port 45 in communication with the port 46. This enables fluid to be pumped by the pump 10 back to the brake 2 and through the one-way valve 23 during the first part of the power stroke of the plunger 17.

When the wheel 2 recovers, the valve 8 closes at point C. As before the pump 10 pumps fluid from the expansion chamber 12 to the brake 2 and the master cylinder 1 but since the valve 8 has closed, the chamber 12 is not replenished from the brake.

The brake is re-applied not only from the master cylinder 1 through the flow-control valve 40 and the orifice 51 but also from the pump 10 through the ports 45 and 48. The spool 41 moves relatively away from the valve 8 until point D is reached at which the spool 41 has returned to its original position and the port 46 is closed to isolate the pump 10 from the brake 2. The brake 2 is then re-applied during a second stage to point E only from the flow-control valve 40, and at a reduced rate of pressure increase.

The anti-lock system of FIGS. 5 and 6 exhibits a two-rate re-apply feature and, as with the embodiments described above, retains the brake pressure at or above the maximum for a relatively long period. This ensures maximum braking efficiency and improved stopping distances.

The system of FIGS. 5 and 6 provides a good feel at the pedal of the master cylinder 1, because the output from the pump 10 to the master cylinder and the flow rate from the master cylinder to the brake 2 are small and are both substantially equal.

I claim:

1. An hydraulic anti-lock braking system for a vehicle comprising a brake on a wheel of the vehicle, an hydraulic master cylinder for supplying hydraulic fluid under pressure to said brake to apply said brake, modulator means for modulating the supply of pressure fluid from said master cylinder to said brake in accordance with the behaviour of said braked wheel, said modulator means comprising fluid storage means comprising an expansion chamber, a first control valve located between said master cylinder and said brake and movable between a first open position to provide communication between said master cylinder and said brake and a second closed position to isolate said brake from said master cylinder, a second control valve located between said brake and said expansion chamber and movable between a first closed position to isolate said brake from said expansion chamber and a second open position in which fluid in said brake is dumped to said expansion chamber, a motor, and a pump driven by said motor to produce an output which generates energy necessary to recover fluid in order to re-apply said brake automatically after said pressure fluid applied to said brake has first been released to said expansion chamber in response to movement of said second control valve into said second open position, said pump comprising a pump plunger movable in opposite first and second directions during an induction stroke and a power stroke respectively, means defining a pressure space in advance of said plunger, a one-way inlet valve through which fluid is adapted to be withdrawn from said expansion chamber into said pressure space upon movement of said plunger in said first direction, a first passage means defining a first connection between said pressure space and said brake, first flow-control means disposed in said first passage means through which fluid is pumped back to said brake, and a second passage means defining a second connection between said pressure space and said master cylinder, and second flow-control means disposed in said second passage means through which fluid is pumped back to said master cylinder, said first flow-control means including first pressure-responsive means responsive to pressure in said brake in opposition to flow from said pump to said brake, said second flow control means including second pressure-responsive means responsive to pressure in said master cylinder in opposition to flow from said pump to said master cylinder, and one of said pressure-responsive means exhibiting a greater resistance to flow than the other of said first pressure-responsive means, whereby fluid is returned by said pump to both said brake and said master cylinder.

2. A system as claimed in claim 1, wherein substantially 70% of said output from said pump is returned to said brake, and the remaining substantially 30% is returned to said master cylinder.

3. A system as claimed in claim 1, wherein said first and second flow-control means are so constructed and arranged that a major proportion of said output from said pump is adapted to be returned to said brake and a relatively smaller proportion is adapted to be returned to said master cylinder.

4. A system as claimed in claim 1, wherein said second flow-control means comprises a second one-way outlet valve.

5. A system according to claim 6, wherein said first flow-control means comprises a first one-way outlet valve, and said system is provided with means for rendering one of the outlet valves inoperative when said plunger has moved through a first predetermined distance during a power stroke whereafter said output from said pump during the remainder of said power stroke takes place through the other of said one-way outlet valves.

6. A system according to claim 5, including an output port leading to the said outlet valve through which said brake is supplied, wherein said outlet valves are arranged so that fluid is pumped to said brake during movement of said plunger through said first predetermined distance, with said output from said pump during the remainder of said power stroke being pumped to said master cylinder after said output port has been masked by said plunger.

7. A system as claimed in claim 4, wherein said first flow-control valve means comprises a restricted orifice, and said orifice is so positioned, constructed, and arranged that said orifice achieves a build up of back pressure capable of causing said second one-way valve to open.

8. A system according to claim 1, wherein both said control valves are responsive to an anti-lock signal whereby said first valve is caused to close and isolate said master cylinder from said brake, said second valve is caused to open to release fluid from said brake to said expansion chamber, and said motor is operated to cause said pump plunger to oscillate.

9. A system according to claim 8, wherein each said control valve comprises a solenoid-operated valve.

10. A system according to claim 8, wherein said first control valve comprises a fluid operated or controlled valve.

11. A system according to claim 1, wherein said second pressure-responsive means exhibits a greater resistance to flow than said first pressure-responsive means, whereby a major portion of fluid from said pump is returned to said brake.

* * * * *